(12) United States Patent
Izumi

(10) Patent No.: US 6,219,021 B1
(45) Date of Patent: Apr. 17, 2001

(54) DISPLAY CONTROL DEVICE AND STORAGE MEDIUM THEREFOR

(75) Inventor: Kazuo Izumi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/124,086

(22) Filed: Jul. 29, 1998

(30) Foreign Application Priority Data

Sep. 29, 1997 (JP) .................................... 9-263326
Sep. 29, 1997 (JP) .................................... 9-263327

(51) Int. Cl.[7] .................................... G09G 3/36
(52) U.S. Cl. .................................... 345/102; 345/87
(58) Field of Search .................................... 345/102, 127, 345/112, 211, 87, 55, 12, 20, 342

(56) References Cited

U.S. PATENT DOCUMENTS

| 5,315,695 | * | 5/1994 | Saito et al. .................... 345/432 |
| 5,347,293 | | 9/1994 | Wiedemann et al. . |
| 5,475,399 | * | 12/1995 | Borsuk .................... 345/130 |

FOREIGN PATENT DOCUMENTS

| 0 464 552 A2 | 1/1992 | (EP) . |
| 0 730 371 A2 | 9/1996 | (EP) . |
| 2-190895 | 7/1990 | (JP) . |
| 97/03432 | 1/1997 | (WO) . |

OTHER PUBLICATIONS

Patent Abstracts of Japan, vol. 14, No. 474 (P–1117), Oct. 16, 1990 & JP 02 190895 A (NEC Co.), Jul. 26, 1990.

* cited by examiner

*Primary Examiner*—Richard Hjerpe
*Assistant Examiner*—Alexander Eisen
(74) *Attorney, Agent, or Firm*—Nixon & Vanderhye P.C.

(57) ABSTRACT

A display control device includes a display panel for displaying data containing textual and/or drawing data, a display buffer for storing data to be displayed on the display panel, a display control section for controlling display of the display panel, a backlight for illuminating the display panel, an illumination instruction section for outputting a backlight illumination instruction, and an illumination control section for controlling the illumination of the backlight according to the backlight illumination instruction from the illumination instruction section. The display control section changes a display configuration of the data to be displayed on the display panel when the illumination instruction section outputs the backlight illumination instruction.

10 Claims, 8 Drawing Sheets

| APPLICATIONS \ NUMBER OF DISPLAYED CHARACTERS | 1 ~ 50 | 51 ~ 100 | 101 ~ 150 | 151 ~ 240 |
|---|---|---|---|---|
| SCHEDULE | 30SECONDS | | 45SECONDS | 60SECONDS |
| TELEPHONE | 30SECONDS | | | |
| MEMO | 15SECONDS | 30SECONDS | 45SECONDS | 60SECONDS |

FIG.6A

```
[MEMO]  New Product
New electronic organizer XX-10
0 (XYZ Corp) AUG.18,1997
Display:240x80 dots FSTN-LCD
Memory Size:2M byte Flash
Key:QWERTY type keyboard
Modem:9,600-28,800dps
Size:150(W)x80(D)x16(H)mm
```

FIG.6B

```
[MEMO]  New Product
New electronic organizer
0 (XYZ Corp) AUG.18,1997
Display:240x80 dots FSTN-
Memory Size:2M byte Flash
Key:QWERTY type keyboard     →
Modem:9,600-28,800dps        ↓
```

FIG.6C

```
[MEMO]  New Product
New electronic organiz
0 (XYZ Corp) AUG.18,19
Display:240x80 dots FS
Memory Size:2M byte Fl    →
Key:QWERTY type keyboa    ↓
```

FIG.6D

```
[MEMO]  New Product
New electronic organizer XX-10
0 (XYZ Corp) AUG.18,1997
Display:240x80 dots FSTN-LCD
Memory Size:2M byte Flash
Key:QWERTY type keyboard
Modem:9,600-28,800dps
Size:150(W)x80(D)x16(H)mm
```

FIG.7

```
[MENU]  Character Size
When Backlight Lit

1.Normal
  * 2.Medium
    3.Large
```

FIG.8A

[SCHEDULE]
OCT 3,1997
13:00 ~ 15:00
Sales Meeting A
(Conference Room #202)

FIG.8B

[TELEPHONE]
T.MATSUNAGA
ABC corporation
Manager
012-345-6789

FIG.8C

[MEMO] New Product
New electronic organizer XX-10
0 (XYZ Corp) AUG.18,1997
Display:240x80 dots FSTN-LCD
Memory Size:2M byte Flash
Key:QWERTY type keyboard
Modem:9,600-28,800dps
Size:150(W)x80(D)x16(H)mm

FIG.8D

[MEMO] Hotel
New BB Hotel OCT.10-12
(#012345678)

FIG.10

| APPLICATIONS \ NUMBER OF DISPLAYED CHARAC-TERS | 1~50 | 51~100 | 101~150 | 151~240 |
|---|---|---|---|---|
| SCHEDULE | 30SECONDS | | 45SECONDS | 60SECONDS |
| TELEPHONE | 30SECONDS | | | |
| MEMO | 15SECONDS | 30SECONDS | 45SECONDS | 60SECONDS |

DISPLAY CONTROL DEVICE AND STORAGE MEDIUM THEREFOR

CROSS-REFERENCES TO RELATED APPLICATIONS

This application is related to Japanese applications Nos. HEI 9(1997)-263326 and HEI 9(1997)-263327, both filed on Sep. 29, 1997, whose priorities are claimed under 35 USC §119, the disclosures of which are incorporated by reference in their entirety.

BACKGROUND OF THE INVENTION

1. Field of the Invention

The present invention relates to a display control device having an illuminating function and a storage medium therefor. The control device is applicable to a small-sized portable electronic system such as an electronic notebook or a portable information terminal.

2. Description of Related Art

With development of liquid crystal display devices, semiconductors and electronics techniques, numerous kinds of small-sized multi-functional portable electronic equipment have been commercialized. With such portable electronic equipment, extension of lives of batteries as well as miniaturization is an important factor, and liquid crystal panels, which are low power displays and exhibit excellent display characteristics, are widely used.

However, since the liquid crystal panel is not a self-luminous device, it is difficult to read a screen of the panel under low light conditions. For this reason, a backlight is recently used for illuminating the liquid crystal display panel.

For example, generally adopted is a method of illuminating a liquid crystal display panel using an electroluminescent panel (an EL panel) as a backlight which is mounted on the rear side of the display panel provided with a semi-transmission type reflector.

This method was initially applied to smaller-sized electronic devices such as electronic watches and pagers, and is now used for portable electronic devices having medium-sized screens such as electronic notebooks.

However, the backlight consumes a lot of electric power and, when it is kept on for a long time, a battery life is greatly affected. Therefore, some backlights are designed to emit light of a reduced luminance as low as possible.

In order to reduce power consumption of the backlight, light emission of the backlight is controlled in the following manners:

(1) When an illumination key is actuated, the backlight emits light for a given time and then goes off automatically.

(2) Only while the illumination key is being actuated, the backlight emits light.

(3) Ambient brightness is measured with a brightness sensor. When the brightness falls below a predetermined level, the backlight emits light. Then, when the brightness exceeds the predetermined level, the backlight goes off automatically.

Particularly, with portable electronic devices, the above (1) is widely used since it allows a user to activate the backlight for the given time period only when necessary.

Another method of reducing power consumption of the backlight is disclosed by Japanese Unexamined Patent Publication No. HEI 2(1990)-190895, for example. According to this disclosure, an EL panel is capable of emitting light on a one-character basis, and EL elements are driven only in a region where textual data or drawing data is to be displayed. By use of this method of driving the EL elements, it is possible to save power which would otherwise be necessary for driving EL elements in a region where textual data or drawing data is not displayed.

However, according to the aforesaid method in which the backlight emits light of a reduced luminance, the display is not easy to see in a dark environment even if the backlight is turned on to illuminate the display. Of course, an increase of the luminance will make the display easier to see, but the increase of the luminance will result in a rise in power consumption and therefore a decrease in the battery life.

According to the aforesaid backlight light-emission control (1), the backlight emits light for the given time regardless of the number of displayed characters. Accordingly, for example, in the case of an electronic notebook which has a relatively large screen and may display a lot of characters, the backlight may possibly go off before a user has finished reading all characters. If the backlight light-emission time is set longer, the backlight wastefully consumes the battery by staying on after all characters have been read, in the case where only a small number of characters are displayed.

According to the aforesaid backlight light-emission control (2), the user must keep pushing the illumination key. Therefore, the method cannot be used for an electronic device such as an electronic notebook which requires key operation.

According to the aforesaid backlight light-emission control (3) of automatically turning on the backlight when the ambient brightness falls below the predetermined level by use of the brightness sensor, cost increases. In addition to that, the backlight keeps producing light in dark conditions even when unnecessary, which results in a decrease of the battery life.

According to the aforesaid method disclosed by Japanese Unexamined Patent Publication HEI 2(1990)-190895, a special EL panel is required and the EL panel is driven in a rather complicated manner. Accordingly, cost increases. In addition to that, consideration is not given to effect of an extended light-producing time on the battery life.

SUMMARY OF THE INVENTION

In view of the above-described circumstances, the present invention is to provide a display control device which allows reduction of power consumption by a backlight when data such as textual data or drawing data is displayed on a display panel with the backlight on, by changing display form of the data for improving visibility of the data on a display and/or by varying a light-emission time period of the backlight depending on the volume of the data.

The present invention provides a display control device comprising a display panel for displaying data containing textual and/or drawing data; a display buffer for storing data to be displayed on the display panel; a display control section for controlling display of the display panel; a backlight for illuminating the display panel; an illumination instruction section for outputting a backlight illumination instruction; and an illumination control section for controlling the illumination of the backlight according to the backlight illumination instruction from the illumination instruction section, wherein the display control section changes a display configuration of the data to be displayed on the display panel when the illumination instruction section outputs the backlight illumination instruction.

BRIEF DESCRIPTION OF THE DRAWINGS

FIGS. 6(a) to 6(d) show exemplary screen displays (1) in accordance with an embodiment of the present invention;

FIG. 7 shows an example of a screen for setting the size of characters to be displayed in accordance with an embodiment of the present invention;

FIGS. 8(a) to 8(d) show exemplary screen displays (2) in accordance with an embodiment of the present invention;

FIG. 10 is an exemplary table illustrating correspondence between the number of displayed characters and a backlight light-emission time in accordance with an embodiment of the present invention.

DESCRIPTION OF THE PREFERRED EMBODIMENTS

Figure 1:
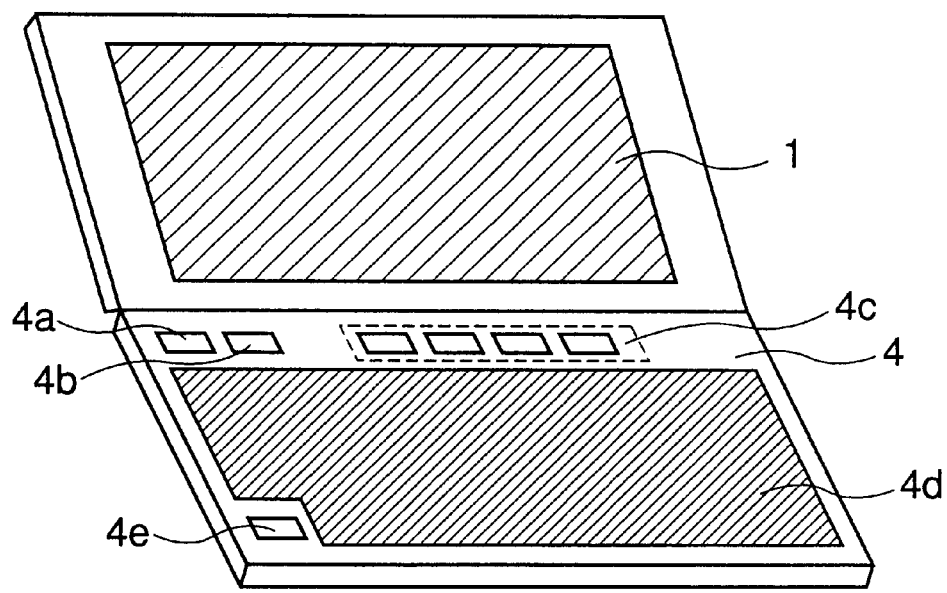
FIG. 1 is a perspective view illustrating the appearance of an electronic pocketbook to which a display control device in accordance with the present invention is applied.

The display control device of the present invention is constructed to have a display panel for displaying data containing textual and/or drawing data, a display buffer for storing data to be displayed on the display panel, a display control section for controlling display of the display panel, a backlight for illuminating the display panel, an illumination instruction section for outputting a backlight illumination instruction, and an illumination control section for controlling the illumination of the backlight according to the backlight illumination instruction from the illumination instruction section. The display control section changes a display configuration of the data to be displayed on the display panel when the illumination instruction section outputs the backlight illumination instruction.

In the present invention, the display panel preferably include a liquid crystal display panel with a semi-transmission type reflector mounted on the rear side of the panel. The backlight is composed of an EL (electroluminescent) panel and is preferably constructed to be able to be assembled with being placed on the rear side of the liquid crystal display panel.

The display buffer, the display control section and the illumination control section are preferably composed of a computer including a CPU, a ROM, a RAM, and an I/O port. In particular, the display buffer may be composed of a RAM, and the display control section and the illumination control section may be composed of a CPU. The illumination instruction section may preferably include an input device such as a keyboard or a transparent tablet formed on the surface of the display panel.

According to the present invention, visibility of data displayed on the display panel can be improved by changing display configurations (size, font, normal/reverse video, etc.) when the backlight is turned on to illuminate the display panel.

Further, since the amount of light from the backlight can be reduced thanks to the improvement of visibility, the battery's life will extend in a portable electronic device driven by a battery which device includes the display control device of the present invention.

The display control section may be constructed such that, when the illumination instruction section outputs the backlight illumination instruction, the display control section changes a display size of the data stored in the display buffer for displaying the data on the display panel.

With this construction, since the displayed data (e.g., textual data) is automatically increased in size when the backlight illuminates, a display screen exhibiting good visibility to a user can be provided.

The display buffer may be constructed to pre-store a plurality of display sizes for the data to be displayed on the display panel. The display sizes can be selected.

With this construction, since a user can pre-set the display size in which the data (e.g., textual data) is to be displayed, a display screen exhibiting good visibility to individual users can be provided.

The display control section may be constructed such that, when the illumination instruction section outputs the backlight illumination instruction, the display control section controls the display panel to display the data stored in the display buffer in reverse video.

With this construction, black characters are displayed against a white background under a normal condition, and white characters are displayed against a black background when the backlight is on. Thereby, a display screen exhibiting good visibility to a user can be provided.

The control device of the invention may further comprise a count section for counting the number of characters of the data to be displayed on the display, wherein when the illumination instruction section outputs the backlight illumination instruction, the illumination control section changes a time period of illumination of the backlight according to the number of characters counted by the count section.

With this construction, the backlight can be set to be on for a proper time depending on the number of characters to be displayed. Thereby, even in the case where a large number of characters are displayed, the inconvenience of the backlight going off before a user have finished reading can be avoided. On the other hand, in the case where a small number of characters are displayed, the backlight can be prevented from producing light wastefully for a long period. Thus, the power consumption can be reduced and the life of the battery can increase.

The control device of the invention may further comprise an illumination time period setting table storing a plurality of backlight illumination time periods in correspondence with the number of characters of the data to be displayed on the display panel, wherein when the illumination instruction section outputs the backlight illumination instruction, the illumination control section controls the illumination of the backlight according to the illumination time period read from the illumination time period setting table.

The control device of the invention may further comprise an illumination time period setting table storing a backlight illumination time period per one character and a calculation section for calculating an illumination time period corresponding to the number of characters of the data to be displayed on the display panel by reference to the illumination time period setting table, wherein when the illumination instruction section outputs the backlight illumination instruction, the illumination control section controls the illumination of the backlight according to the illumination time period calculated by the calculation section.

The control device of the invention may further comprise an illumination time period setting table storing a backlight illumination time period for every application, wherein when the illumination instruction section outputs the backlight illumination instruction, the illumination control section controls the illumination of the backlight according to the illumination time period for an application in use read from the illumination time period setting table.

With this construction, since the backlight illumination time can easily be designated according to an application such as a schedule, telephone or memorandum application, the backlight can be kept on for a proper time according to not only the number of displayed characters but also the application. Therefore, a display screen convenient to a user can be provided.

The illumination control section may comprise a notice section for informing that the backlight is going to be off a predetermined time before the backlight goes off.

The notice section may be composed of a piezo-electric beeper.

With this construction, a user is informed a given time in advance that the backlight is going to be off, and the user can extend the illumination time, if necessary. Thus the backlight does not go off against the user's intention. Therefore, a display screen convenient to the user can be provided.

In another aspect, the present invention provides storage medium containing thereon a computer program for controlling a display control device including a display panel for displaying data containing textual and/or drawing data, a display buffer for storing the data to be displayed on the display panel, a backlight for illuminating the display panel and an illumination instruction section for outputting a backlight illumination instruction. The computer program performs the functions of causing a computer operation to control illumination of the backlight according to the backlight illumination instruction from the illumination instruction section; causing a computer operation to control display of the display panel; and causing a computer operation to change a display configuration of the data to be displayed on the display panel when the illumination instruction section outputs the backlight illumination instruction.

The storage medium may further perform the functions of causing a computer operation to count the number of characters of the data stored in the display buffer to be displayed on the display panel; and causing a computer operation to change a time period of illumination of the backlight according to the counted number of characters.

With the above-mentioned construction, by installing the control program stored in the storage medium, a display control device can be obtained, which device can reduce power consumption by the backlight by improving the visibility of displayed data such as characters or drawings through changing the display configuration of the data when the backlight illuminates the display panel for displaying the data, and through changing the illuminating time period of the backlight according to the amount of the data.

EXAMPLES

The present invention is now described in detail by way of example with reference to the accompanying drawings, which should not be construed to limit the scope of the invention. In the following examples, the present invention is explained as a display control device adapted to an electronic pocketbook which is a kind of portable electronic equipment.

FIG. 1 is a perspective view illustrating the appearance of an electronic pocketbook to which a display control device in accordance with the present invention is applied. In FIG. 1, the reference numerals 1, 4, 4a, 4b, 4c, 4d and 4e denote a display section, a key input section, an ON key, an OFF key, a function key, an alphanumeric input key and a backlight key, respectively. In the electronic pocketbook, the display section 1 and the key input section 4 are joined together with a hinge. When the electronic pocketbook is not in use, the electronic pocketbook can be closed with the display section 1 and the key input section inside. Electronic circuits and a battery for driving the electronic pocketbook are accommodated under the display section 1 and the key input section 4. The battery can be replaced from the bottom surface of the key input section 4.

Figure 2:
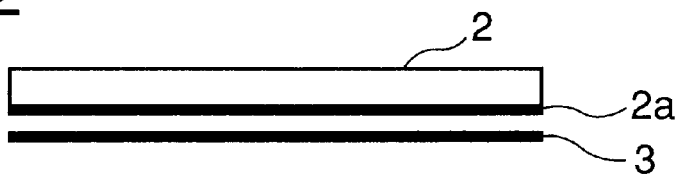
FIG. 2 is a schematic cross-sectional view illustrating the construction of a display section of the electronic pocketbook to which the display control device in accordance with the present invention is applied.

FIG. 2 is a schematic cross-sectional view illustrating the construction of the display section of the electronic pocketbook to which the display control device in accordance with the present invention is applied. As shown in FIG. 2, the display section 1 is composed of a liquid crystal display panel 2 provided with a semi-transmission type reflector 2a on the bottom surface thereof and a backlight 3 using an EL panel. The backlight 3 is mounted on the bottom surface of the display panel 2 with intervention of the reflector 2a.

The display section 1 is constructed such that characters or drawings displayed on the display panel 2 are seen by external light reflected by the semi-transmission type reflector 2a in a bright ambiance and by light emitted by the backlight 3 and passing though the reflector 2a in a dark ambiance.

Figure 3:
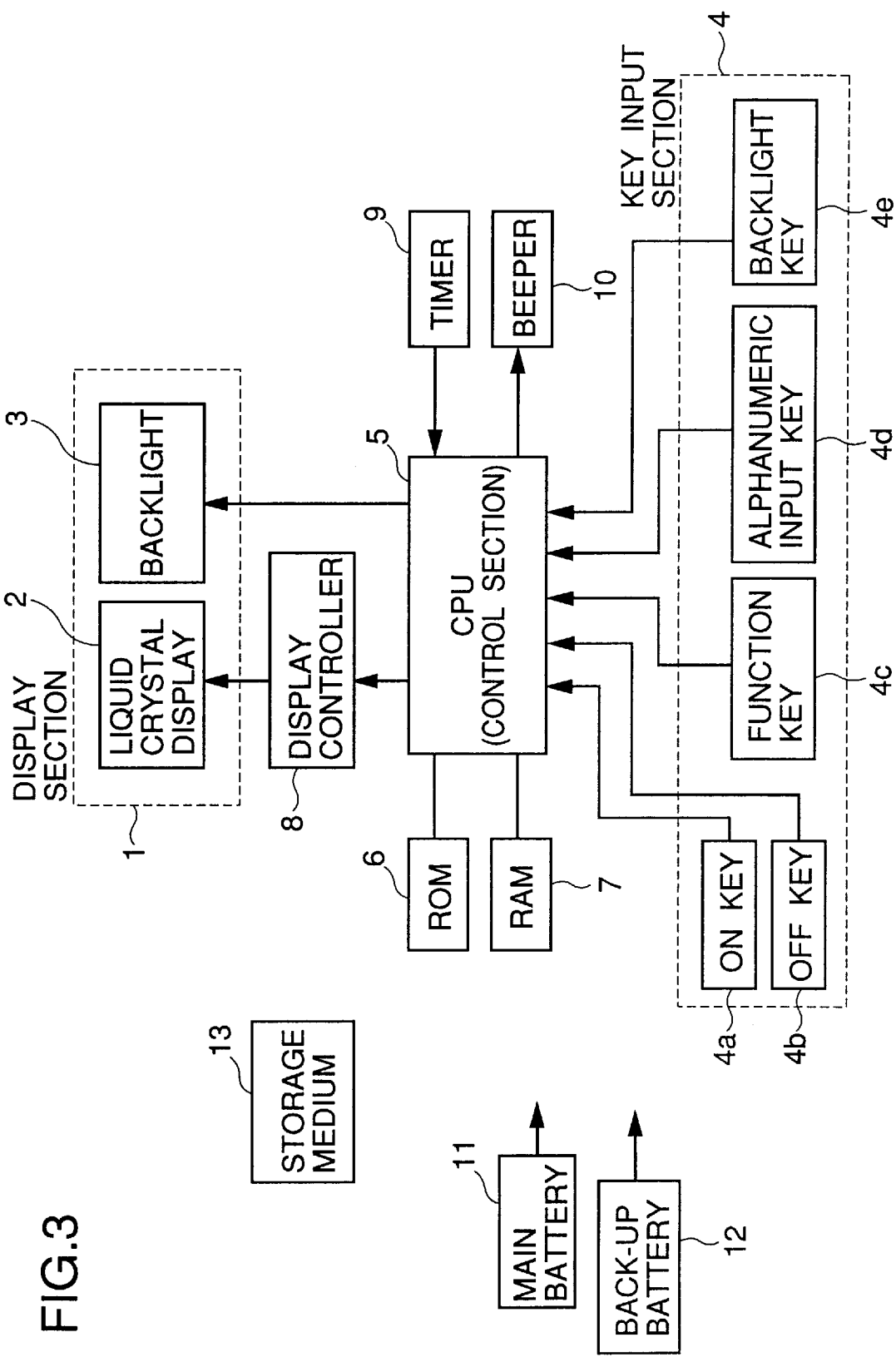
FIG. 3 is a block diagram illustrating the structure of the electronic pocketbook to which the display control device in accordance with the present invention is applied.

FIG. 3 is a block diagram illustrating the structure of the electronic pocketbook to which the display control device in accordance with the present invention is applied. In FIG. 3, elements similar to those previously described with reference to FIGS. 1 and 2 are denoted by the same reference numerals. The reference numeral 5 denotes a CPU for generally controlling key input, data display, data processing, storage and the like. The reference numeral 6 denotes a ROM for storing programs to cause the CPU 5 to operate. The reference numeral 7 denotes a RAM for storing data about schedules, telephone numbers, etc. inputted by a user. The RAM 7 also serves as a work memory for the CPU 5.

The reference numeral 8 denotes a display controller for controlling the display section 1 and causing data sent from the CPU 5 to be displayed on the display panel 2 of the display section 1.

The key input section 4 is composed of the ON key 4a, OFF key 4b, function key 4c, alphanumeric input key 4d, and backlight key 4e. The ON key 4a and OFF key 4b are used for turning the power of the electronic pocketbook on and off, respectively. The function 4c is used for switching applications such as a schedule, a telephone book, a memorandum, etc., and for performing various settings.

The alphanumeric input key 4d is used for inputting data and performing various kinds of settings. By operating the alphanumeric input keys 4d, an alphabet from A to Z, numerals and a number of symbols can be inputted.

The backlight key 4e is actuated when the user needs to see displayed content in a dark environment. When this key is actuated, the backlight emits light for a predetermined time period and then goes off automatically.

The reference numeral 9 denotes a timer to generate a basic clock signal for time display. The timer 9 is also used for schedule management.

The reference numeral 10 denote a beeper to generate a touch sound when a key is actuated and an alarm sound. The beeper is also used to sound a notice beep for giving the advance notice of the backlight going off a predetermined time before the backlight actually goes off.

The reference numeral 11 denotes a main battery for driving the electronic pocketbook. The reference numeral 12 denotes a back-up battery for retaining data and settings stored n the RAM 7 while the main battery 11 is being replaced, for example.

The reference numeral 13 denotes a storage medium composed of an floppy disk (FD), CD-ROM or the like. In the storage medium, stored is the same program as the operational program of the present invention stored in the ROM 6.

In another embodiment, by instructions of the CPU 5, the program for executing the operation of the present invention can be read from the storage medium 13 into the RAM 7 through storage medium reading means (not shown), so that the same operation is executed as in the case where the program is stored in the ROM 6.

The electric pocketbook of this embodiment has a number of applications such as a schedule, a telephone book, a memorandum application and the like. The applications can be switched by actuating the function key 4c.

Explanation about functions of the applications such as data inputting, editing and searching, which do not have direct relation to the present invention, is omitted in this specification.

Figure 4:
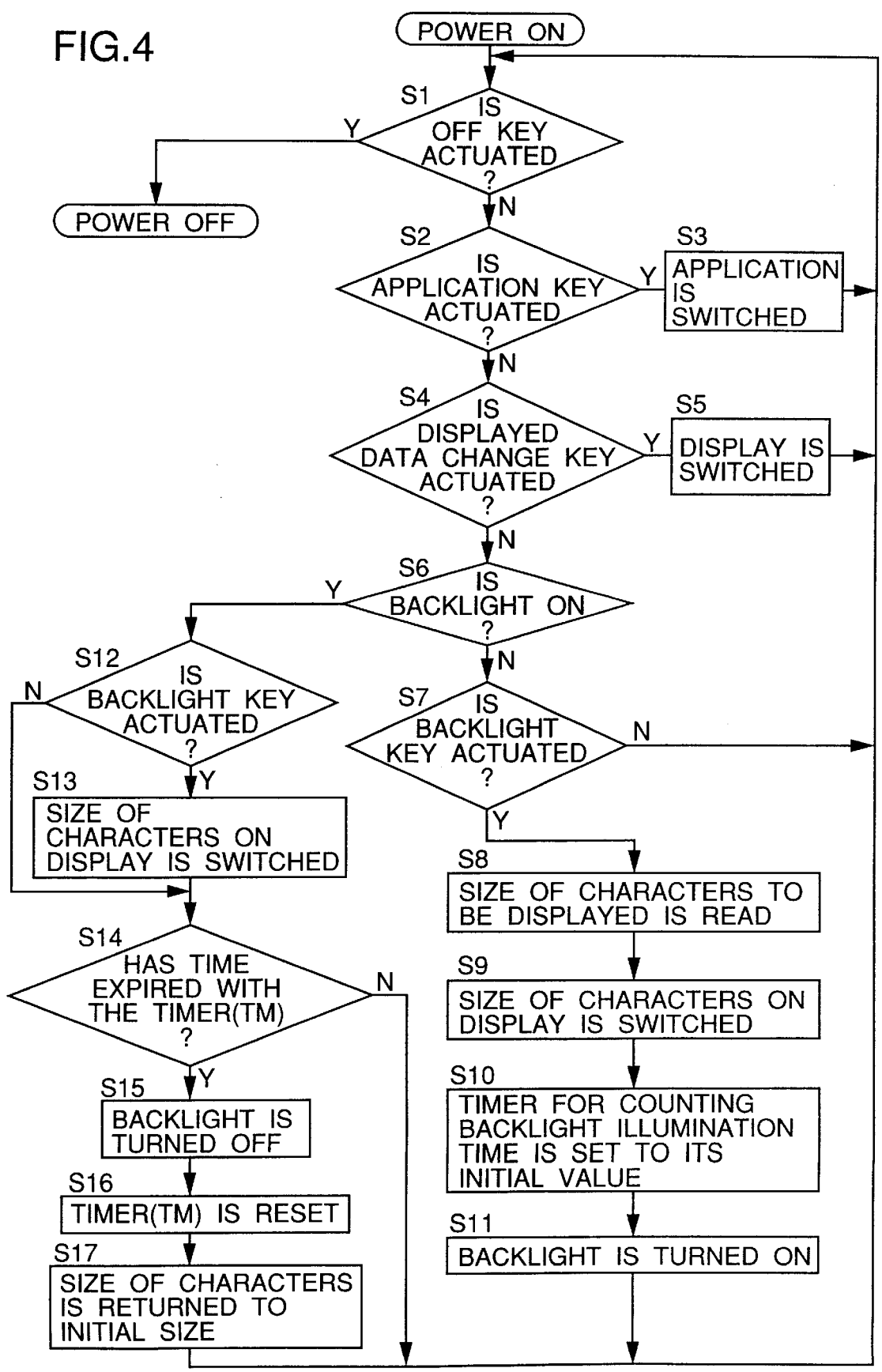
FIG. 4 is a flowchart illustrating a operational process (1) in accordance with an embodiment of the present invention.

FIG. 4 is a flowchart illustrating an operational process (1) in accordance with an embodiment of the invention. Referring to the flowchart of FIG. 4, explanation is given provided that data shown in FIGS. 6(a) to 6(d) and FIG. 7 have been inputted to the RAM 7.

First, when the user pushes the ON key 4a, an ON signal is inputted to the CPU 5 and operation starts. If this is the first time to use the electronic pocketbook, an initial display, for example, a schedule data input display, is displayed. If any data has already been stored, a display just before turning off the power supply is displayed.

STEP S1: The CPU 5 is in a state of waiting for a key input from keys such as the OFF key, an application switch key, a displayed data change key or the backlight key. First, the CPU 5 checks the status of the OFF key. If the OFF key is actuated, the display is turned off and the power supply gets in an OFF state.

STEP S2: If the OFF key is not actuated, the status of the application switch key is checked.

STEP S3: If the application switch key is actuated, an application corresponding to the key operation is displayed. Then the process goes back to STEP S1 and the CPU 5 returns to the state of waiting for a key input.

STEP S4: If the application switch key is not actuated, a key operation for changing displayed data is checked.

STEP S5: If the key operation for changing displayed data is executed, designated data is displayed. Then the process goes back to STEP S1 and the CPU 5 returns to the state of waiting for a key input.

Here, the key operations for changing displayed data include key operations for displaying one case from a displayed list, for scrolling displayed data back and forth by an arrow key and for retrieving and displaying desired data using data retrieving function. Detailed explanation of these functions and specific operations is omitted.

STEP S6: Whether the backlight is on or off is checked.

STEP S7: If the backlight is off, the status of the backlight key is checked. If the backlight key is not actuated, the process goes to STEP1 and the CPU 5 returns to the state of waiting for a key input.

STEP S8: If the backlight is on, the size of characters pre-set by the user are read out of the RAM 7. In this embodiment, characters are stored in a plurality of sizes (e.g., three sizes) beforehand and the user can switch among the plural sizes for display of characters.

FIGS. 6(a) to 6(d) show a set (1) of exemplary screen displays in accordance with the embodiment, and FIG. 7 shows an exemplary screen display for setting the size of characters to be displayed in accordance with the embodiment.

When a menu key is actuated for selecting a setting display and then a menu for setting the size of characters while the backlight is on is selected, the screen display shown in FIG. 7 is displayed. Here, if a "2" is selected, an asterisk "*" is displayed at the head of "2" and a "Medium" size is selected.

STEP S9: The CPU 5 switches the size of displayed characters from "Normal" to "Medium" on the basis of a size setting read out of the RAM 7, and send data to be displayed to the controller 8. Thereby, the screen switches from the display shown in FIG. 6(a) to that shown in FIG. 6(b).

FIG. 6(a) is a normal display when the backlight is off.

STEP S10: An initial value, e.g., 30 seconds, is set with a timer (TM) for controlling the illumination time of the backlight.

STEP S11: After the backlight is turned on, the process goes back to STEP S1 and the CPU 5 returns to the state of waiting for a key input.

If a "3. Large" is selected in the setting screen display shown in FIG. 7, the screen switches from the display shown in FIG. 6(a) to that shown in FIG. 6(c). Here, as regards FIGS. 6(b) and 6(c) displaying enlarged characters, the screen is too small to display thereon the entire text because the number of characters which can be displayed on the screen decreases. Accordingly, arrow symbols "→" and "↓" are displayed on the lower right portion of the screen to indicate that there is hidden data.

The display control device of the embodiment has also the function of switching the size of characters on display during illumination of the backlight. While the backlight is on, the process goes from STEP S6 to STEP S12.

STEP S12: The actuation of the backlight key is recognized.

STEP S13 the size of displayed characters is switched.

The size of characters on display switches every time when the backlight key is actuated. For example, the size switches that of FIG. 6(a), to that of FIG. 6(b) to that of FIG. 6(c) and then to that of FIG. 6(a) in this embodiment.

STEP S14: If the backlight key is not actuated in STEP S12, whether the timer (TM) indicates the conclusion of the illumination time is checked. If the timer (TM) does not indicate the conclusion of the time, the process goes back to STEP S1 and the CPU 5 returns to the state of waiting for a key input.

STEP S15: If the timer (TM) indicates the conclusion of the illumination time, the backlight is turned off.

STEP S16: The timer (TM) is reset.

STEP S17 The size of displayed characters is switched back to the initial size (shown in FIG. 6(a)). The process goes back to STET S1 and the CPU 5 returns to the state of waiting for a key input.

Figure 5:
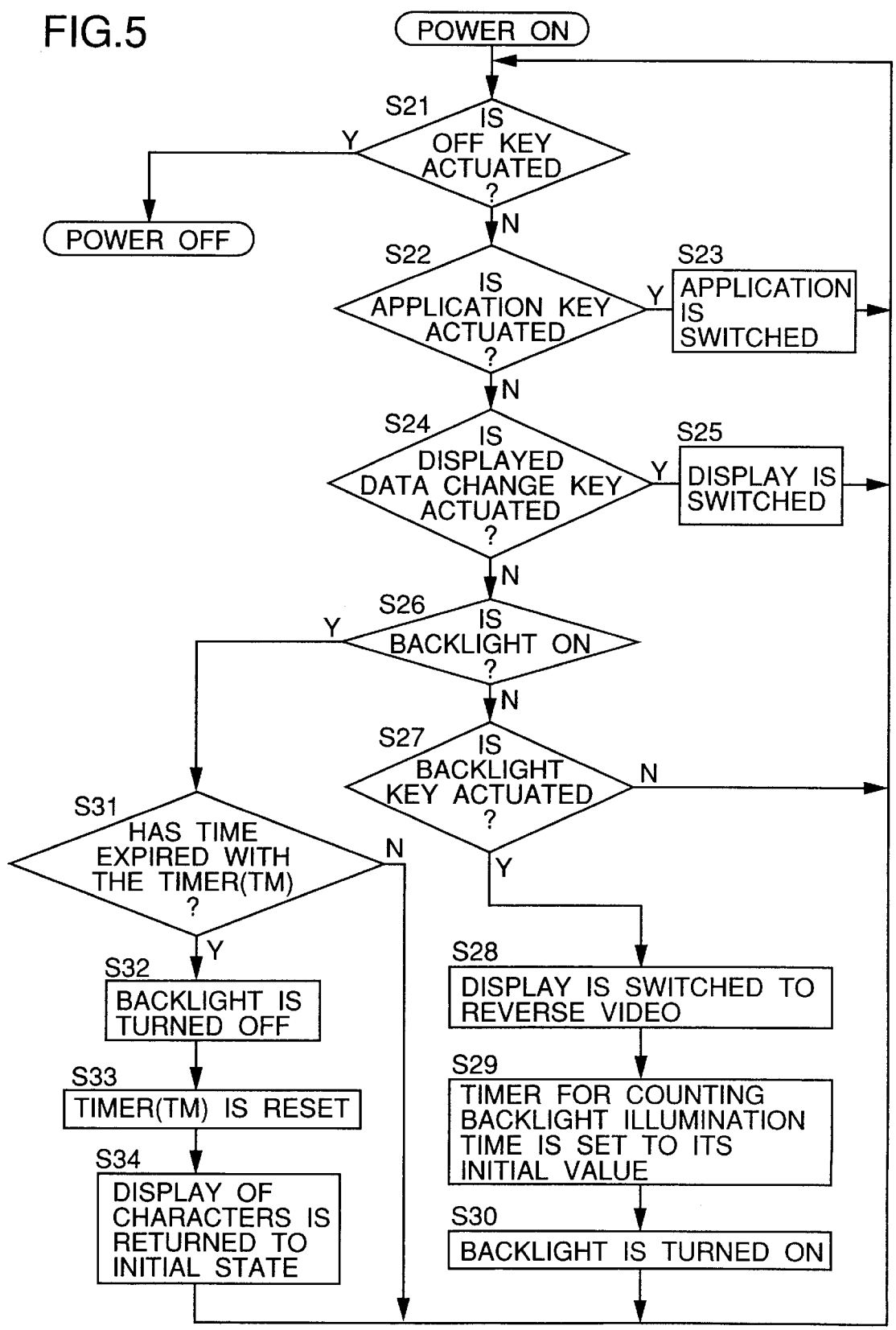
FIG. 5 is a flowchart illustrating a operational process (2) in accordance with an embodiment of the present invention.

FIG. 5 is a flowchart illustrating an operational process (2) in accordance with the embodiment. In the flowchart shown in FIG. 5, the process from STEP S21 to STEP S27 is the same as the process from STEP S1 to S7 in the flowchart shown in FIG. 4, and therefore explanation thereof is omitted.

STEP S28: When the backlight key is actuated in STEP S27, the CPU 5 switches the display to reverse video and transfer data to be displayed to the display controller 8. Thereby, the screen switches from the display shown in FIG. 6(a) to that shown in FIG. 6(d).

STEP S29: An initial value, e.g., 30 seconds, is set with the timer (TM) for controlling the illumination time of the backlight.

STEP S30: After the backlight is turned on, the process goes back to STEP S21 and the CPU 5 returns to the state of waiting for a key input.

If the backlight is on in STEP S26, the process goes to STEP S31.

STEP S31: Whether the timer (TM) indicates the conclusion of the illumination time is checked. If the timer does not indicate the conclusion, the process goes back to STEP S21 and the CPU 5 returns to the state of waiting for a key input.

STEP S32: If the timer (TM) indicates the conclusion, the backlight is turned off.

STEP S33: The timer (TM) is reset.

STEP S34: The reverse display is canceled and the display status returns to its initial state (not reversed as shown in FIG. 6(a)). Then the process goes back to STEP S21 and the CPU 5 returns to the state of waiting for a key input.

Next, explanation is given about applications and exemplary screen displays on the electronic pocketbook of the embodiment. The electronic pocketbook of the embodiment has three kinds of applications, that is, a schedule application, a telephone book application and a memorandum application.

These applications can be switched using the function Key 4c. Here, explanation is given provided that data have already been inputted to the applications.

FIGS. 8(a) to 8(d) show a set (2) of exemplary screen displays in accordance with the embodiment. In the figures, FIG. 8 (a) shows an exemplary screen display of the schedule application, FIG. 8 (b) shows an exemplary screen display of the telephone book application and FIG. 8 (c) shows an exemplary screen display of the memorandum application (on which a large number of characters are displayed), and FIG. 8(d) shows an exemplary screen display of the memorandum application (on which a small number of characters are displayed).

Figure 9:
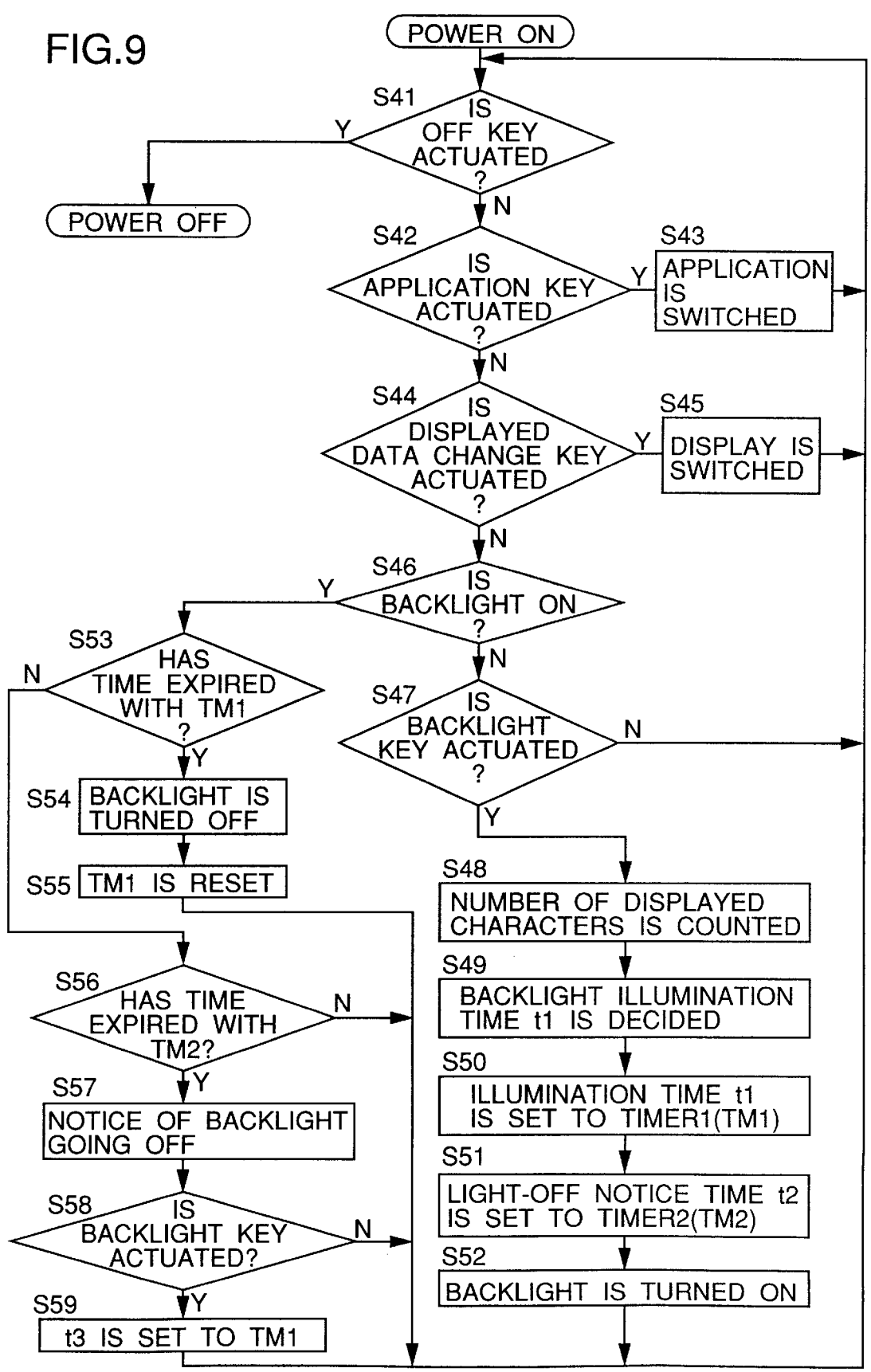
FIG. 9 is a flowchart illustrating a operational process (3) in accordance with an embodiment of the present invention.

FIG. 9 is a flowchart illustrating an operational process (3) in accordance with the embodiment. In the flowchart shown in FIG. 9, the process from STEP S41 to STEP S47 is the same as the process from STEP S1 to S7 in the flowchart shown in FIG. 4, and therefore explanation thereof is omitted.

If the backlight key is actuated in STEP S47, the illumination time is decided according to a display content, as described below, and is inputted to the timer (TM). Then, the backlight is turned on.

STEP S48: When the backlight key is actuated, the number of characters on display is counted.

STEP S49: The illumination time t1 is decided according to the counted number of characters.

STEP S50: The illumination time t1 is inputted to a first timer (TM1).

STEP S51: Time t2 obtained by reducing t0 from the illumination time t1 is inputted to a second timer (TM2) as a notice time for informing the user that the backlight is going off.

STEP S52: The backlight is turned on. The process goes back to STEP S1 and the CPU 5 returns to the state of waiting for a key input. The period t0 represents how earlier the user is to be noticed of the backlight going off. For example, if t0=5, the notice is made 5 seconds before the backlight actually goes off.

Here, the decision of the illumination time is explained by way of a specific example.

FIG. 10 is an exemplary table showing correspondence between the number of displayed characters and the illumination time of the backlight in accordance with the embodiment. As shown in FIG. 10, the correspondence between the number of displayed characters and the illumination time of the backlight is stored for every application in ROM 6 beforehand in the electronic pocketbook of the embodiment. In the embodiment, the liquid crystal display panel is assumed to be capable of displaying 240 characters (30 characters×8 lines) at maximum. In the correspondence table, the number of displayed characters is classified into a plurality of levels. The number of characters actually on display is compared with these levels, and the illumination time of the backlight is decided depending what level the actual number is belong to.

More particularly, the CPU 5 counts the number of characters on display in STEP S48, reads out the correspondence table from ROM 6 for comparison in STEP S49, and decides the illumination time t1.

Here, the correspondence is set for each of the applications because it is considered that more proper illumination time can be set when the illumination time is set for every application. For example, (1) for the memorandum application, the illumination time is in proportion to the number of displayed characters because in usual cases, the user needs only to read and understand a displayed text;

(2) for the schedule application, the illumination time is ensured to some extent (e.g., at east 30 seconds) even if the number of displayed characters is small; and (3) for the telephone book application, a fixed illumination time (e.g., 30 seconds) is set regardless of the number of displayed characters because the user may dial a telephone or push push-buttons with looking at the display.

In the case of FIG. 8(a), for example, since the number of characters on display is 63, the illumination time t1 is 30 seconds according to the correspondence table of FIG. 10. Similarly, in the case of FIG. 8(b), since the number of characters on display is 55 and the application used is the telephone book application, the illumination time t1 is 30 seconds regardless of the number of characters. In the case of FIG. 8(c), since the number of characters on display is 180, the illumination time t1 is 60 seconds. In the case of FIG. 8(d), since the number of characters on display is 42, the illumination time t1 is 15 seconds. Thus, according to the embodiment, the illumination time can be properly set according to the display content and the number of displayed characters.

The table indicating the correspondence between the number of characters on display and the illumination time of the backlight has been explained as being pre-stored in the ROM 6. It is noted, however, the correspondence table may be designed to accept changing and setting by the user and to be stored in the RAM 7.

For deciding the backlight illumination time in STEP S49, alternatively, the illumination time may be set on a character basis. For example, an illumination time of 0.3 seconds is set for one character. This illumination time per character may be multiplied with the number of displayed characters to obtain the illumination time. In the case of the memorandum application for which the illumination time can be decided in proportion to the number of displayed characters, the illumination time can be properly decided by simple calculation.

For example, in the case of FIG. 8(c), since the number of displayed characters is 180, then t1=54 seconds. In the case of FIG. 8(d), since the number of displayed characters is 42, then t1=12.6 seconds. The illumination time per character is fixed and stored in the ROM 6, but the illumination time per character may be set and changed by the user and stored in the RAM 7. Further, in the case where the number of characters is small, the illumination time is extremely short. To avoid this, the minimum illumination time may be set to ensure about 10 seconds for illumination. The above-mentioned two ways of deciding the illumination time may also be used together depending on an application in use.

When the backlight is turned on, the process branches off at STEP S46 to STEP S53, where the timers 1 and 2 (TM1 and TM2) are checked. These two timers are contained in the CPU 5, time is counted up in a hardware independently of operation of software, and a time-up signal is generated within the CPU 5.

STEP S53: Whether the time has expired with the timer 1 (TM1) is checked.

STEP S54: If the time has expired with the timer 1, the backlight is turned off.

STEP S55: The timer 1 (TM1) is reset. The process goes back to STEP S41 and the CPU 5 returns to the state of waiting a key input.

STEP S56: If the time has not expired with the timer 1 (TM1), whether the time has expired with the timer 2 (TM2).

STEP S57: If the time has expired with the timer 2 (TM2), the notice of the backlight going off is made. If t0=5, the notice is made five seconds before the backlight is turned off. The notice in STEP S57 is made only once for each turnoff of the backlight, and is not kept until the time expires with the timer TM1 (judge by a flag).

STEP S58: Then, until the time expires with the timer 1, the actuation of the backlight key is checked.

STEP S59 If the backlight key is actuated before the time expires with the timer 1, a time period t3 is set to the timer 1. The time period t3 is fixed value, for example, 15 seconds. The illumination time is extended for the time period t3.

An object of this notice is to inform the user that the backlight is about to go off and allow the user to extend the illumination time, if necessary. As a way of providing the notice, for example, a short sharp sound generated by the beeper 10 may be easily perceived by the user. As an alternative way of providing the notice, the CPU5 may control the display controller 8 to flicker the backlight once or twice for a short time. These two ways may be combined or selected by the user for further improving convenience.

The present invention presents the following advantages:

(1) By varying the display configuration of data displayed on the display panel when the backlight is turned on to illuminate the display panel, the visibility of the displayed data can be improved.

Furthermore, since the improvement of the visibility contributes to reduction of the amount of the light emitted by the backlight, the life of batteries will increase in portable electronic devices driven by the batteries.

(2) Since the size of the displayed data is increased automatically when the backlight is on, a display screen exhibiting a good visibility can be provided.

(3) Since the user can pre-set in what size the data should be displayed, a display screen presenting a good visibility to every user can be provided.

(4) Under usual conditions, the display panel displays black characters against a white background, and when the backlight is on, the display panel displays white characters against a black background. Thus a display screen easy to read can be provided.

(5) The illumination time of the backlight can be set properly depending on the number of displayed characters. With this feature, even when a large number of characters are displayed, the backlight can be prevented from going off before all the characters have been read. When the number of displayed characters is very small, on the other hand, wasteful lighting of the backlight can be avoided. Thus the power consumption can be reduced and the life of batteries can extend.

(6) The illumination time of the backlight can be easily decided according to an application used such as the schedule, telephone book or memorandum application. Thus, a proper illumination time of the backlight can be provided according to the content of display as well as the number of displayed characters. A display screen convenient to the user can be provided.

(7) Since the user is informed of the backlight going off a predetermined time in advance. The backlight does not go off against the user's intention. The illumination time of the backlight can be extended, as required. A display screen convenient to the user can be provided.

What is claimed is:

1. A display control device comprising:
   a display panel for displaying data containing textual and/or drawing data;
   a display buffer for storing data to be displayed on the display panel;
   a display control section for controlling display of the display panel;
   a backlight for illuminating the display panel;
   an illumination instruction section for outputting a backlight illumination instruction; and
   an illumination control section for controlling the illumination of the backlight according to the backlight illumination instruction from the illumination instruction section,
   wherein the display control section changes a display configuration of the data to be displayed on the display panel when the illumination instruction section outputs the backlight illumination instruction,
   further comprising an illumination time period setting table storing a backlight illumination time period per one character and a calculation section for calculating an illumination time period corresponding to the number of characters of the data to be displayed on the display panel by reference to the illumination time period setting table, wherein when the illumination instruction section outputs the backlight illumination instruction, the illumination control section controls the illumination of the backlight according to the illumination time period calculated by the calculation section.

2. The display control device according to claim 1, wherein when the illumination instruction section outputs the backlight illumination instruction, the display control section changes a display size of the data stored in the display buffer for displaying the data on the display panel.

3. The display control device according to claim 1, wherein the display buffer pre-stores a plurality of display sizes for the data to be displayed on the display panel, the display sizes being able to be selected.

4. The display control device according to claim 1, wherein when the illumination instruction section outputs the backlight illumination instruction, the display control section controls the display panel to display the data stored in the display buffer in reverse video.

5. The display control device according to claim 1 further comprising a count section for counting the number of characters of the data to be displayed on the display, wherein when the illumination instruction section outputs the backlight illumination instruction, the illumination control section changes a time period of illumination of the backlight according to the number of characters counted by the count section.

6. The display control device according to claim 1 further comprising an illumination time period setting table storing a plurality of backlight illumination time periods in correspondence with the number of characters of the data to be displayed on the display panel, wherein when the illumination instruction section outputs the backlight illumination instruction, the illumination control section controls the illumination of the backlight according to the illumination time period read from the illumination time period setting table.

7. The display control device according to claim 1 further comprising an illumination time period setting table storing a backlight illumination time period for every application, wherein when the illumination instruction section outputs the backlight illumination instruction, the illumination control section controls the illumination of the backlight according to the illumination time period for an application in use read from the illumination time period setting table.

8. The display control device according to claim 1, wherein the illumination control section comprises a notice section for informing that the backlight is going to be off a predetermined time before the backlight goes off.

9. A storage medium containing thereon a computer program for controlling a portable, battery driven display control device including a display panel for displaying data containing at least one of textual and drawing data, a display buffer for storing the data to be displayed on the display panel, a backlight for illuminating the display panel and an illumination instruction section for outputting a backlight illumination instruction, the computer program performing the functions of:
   causing a computer operation to control illumination of the backlight according to the backlight illumination instruction from the illumination instruction section;
   causing a computer operation to control display of the display panel; and
   causing a computer operation to change a display configuration of the data from a first configuration to a second configuration to be displayed on the display panel when the illumination instruction section outputs the backlight illumination instruction, wherein said second configuration enables a reduction in time needed to view said data as compared to said first configuration in order to reduce illumination time and corresponding battery consumption; and
providing an illumination time period setting table storing a backlight illumination time period per one character and calculating an illumination time period corresponding to the number of characters of the data to be displayed on the display panel by reference to the illumination time period setting table, wherein when the illumination instruction section outputs the backlight illumination instruction, the illumination of the backlight is controlled according to the calculated illumination time period.

10. The storage medium according to claim 9, wherein the computer program further performs the functions of:
   causing a computer operation to count the number of characters of the data stored in the display buffer to be displayed on the display panel; and
   causing a computer operation to change a time period of illumination of the backlight according to the counted number of characters.

* * * * *